Oct. 20, 1942.  E. CHALMER ET AL  2,299,380
PIG-RINGS OR THE LIKE
Filed May 12, 1941
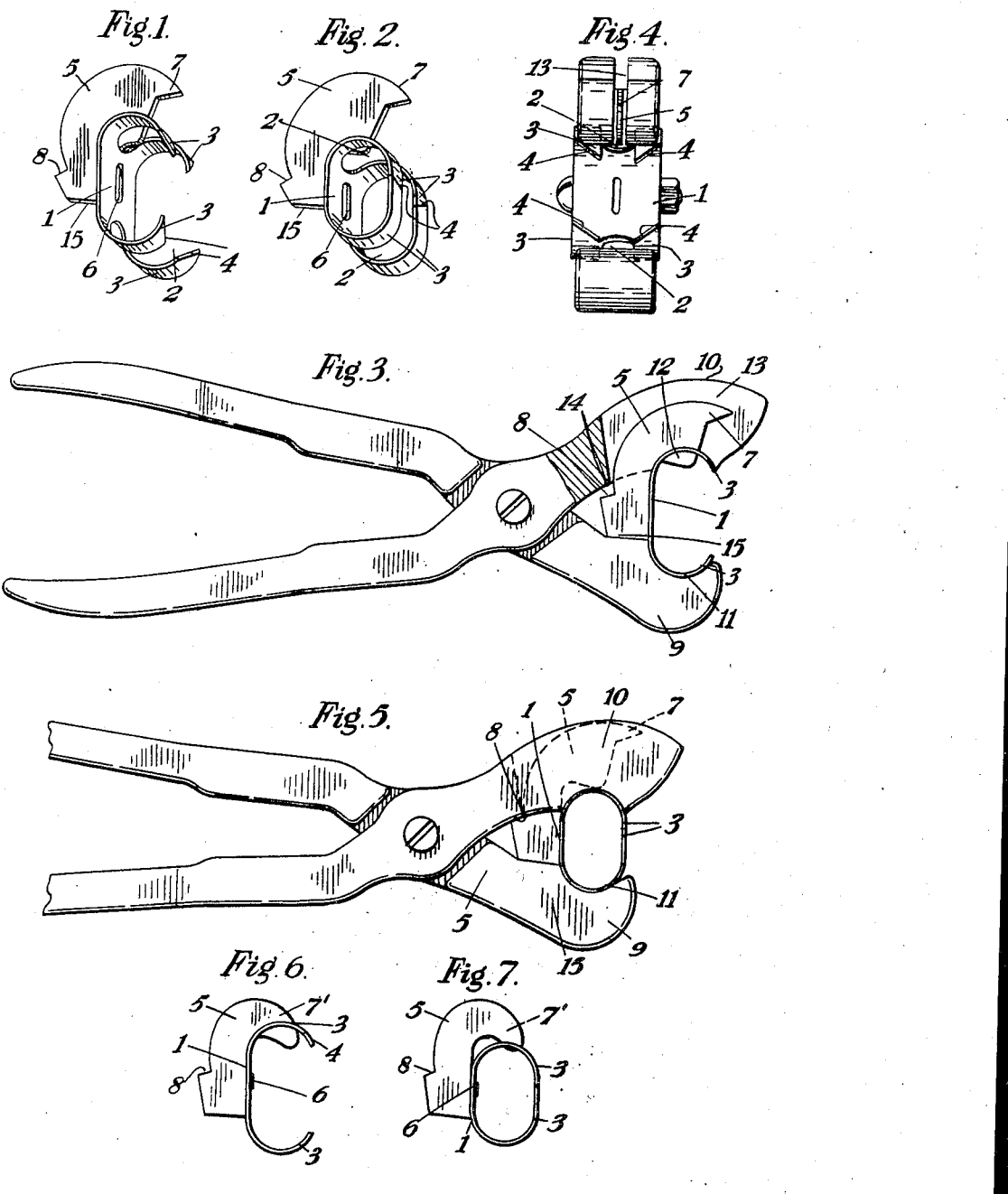
INVENTORS,
E. CHALMER
H. TAYLOR
ATTORNEYS Patented Oct. 20, 1942

2,299,380

UNITED STATES PATENT OFFICE 2,299,380

PIG RINGS OR THE LIKE

Ernest Chalmer and Hubert Taylor, Surbiton, England

Application May 12, 1941, Serial No. 393,106
In Great Britain May 21, 1940

9 Claims. (Cl. 119—135)

This invention relates to improvements in or relating to pig-rings or the like.

Rings are sometimes placed in the snouts of animals for the purpose, for example, of preventing such animals from rooting, it being common for instance to place such rings in the snouts of pigs for such purpose. The term "pig-ring" as used herein is intended to cover any form of attachment suitable for the purpose concerned and is in no sense restricted to a device which is strictly in the form of a ring.

The rings at present commonly employed for ringing pigs are usually passed through a part of the snout which is composed of gristle in which case the fitting of the ring need not entail any cruelty to the animal and similarly there is very little, if any, tendency for the ring to prevent rooting as the animal does not experience any pain when pressure is applied to the ring. If on the other hand the ring is passed through a sensitive part of the snout then the fitting of such ring is attended by objectionable cruelty to the animal and moreover such animal is caused unnecessary pain such for instance as when feeding or on any occasions when pressure is applied to the ring.

One of the objects of the present invention is to provide a ring which when fitted will cause the animal pain if it attempts any rooting or like operations but one which does not cause any objectionable interference with normal feeding and one which in fitting does not involve any objectionable cruelty to the animal.

A further object is to provide a pig-ring having laterally spaced prongs for securing the device to a relatively insensitive part of the snout of an animal so that in the event of the animal performing rooting or like operations the pig-ring will tend to turn about one pair of prongs so swinging the other pair outwardly and thereby pulling the insensitive or gristly portion of the snout away from the fleshly or sensitive portion and causing the animal pain.

Yet another object of the present invention is to provide a pig-ring having prongs adapted to be passed through the gristle or relatively insensitive part of the snout of an animal and an outwardly projecting portion having a rearwardly extending tail portion adapted to make contact with a sensitive part of the snout in the event of the ring before forcibly moved for instance by the animal rooting.

A still further object of the present invention is to provide a pig-ring of the kind concerned which is shaped for co-operation with a pair of pliers in such a way that the pliers cannot be closed beyond the extent necessary for properly applying the ring.

With the above and other objects in view which will be hereinafter apparent the present invention resides in the details of construction and arrangement of parts as hereinafter described and as claimed in the appended claims.

In a general sense the present invention resides in a pig-ring or the like having a part adapted to pass through the gristle or relatively insensitive part of the snout of an animal and one or more projecting portions extending outwardly therefrom.

In order that the present invention may be well understood we will now describe, by way of example only, some embodiments thereof in greater detail and with reference to the accompanying drawing wherein:

Figure 1 is a perspective view of one form of pig-ring or the like in the open condition, Figure 2 is a similar view but showing the device in the closed condition, Figure 3 is a part sectional elevation of a pair of pliers in accordance with said embodiment and adapted for use in applying the pig-ring or the like to an animal, the figure showing the pliers open with a ring in position ready for the applying operation, Figure 4 is an end view of Figure 3 looking from the right-hand side thereof, and Figure 5 is a fragmentary view showing the condition of the pliers when the ring or the like has been brought to closed condition after application, Figure 6 is a side elevation of a modified form of ring in an opened condition, and Figure 7 is a view similar to that shown in Figure 6 but with the ring in a closed condition.

The device shown in Figures 1 to 5 is made of sheet metal and consists of a small plate 1 having U-shaped recesses 2 extending inwardly from both ends thereof so as to form four legs 3. The legs 3 are bent away from the body of the plate and towards one another and form pairs of prongs in alignment with one another so that in conjunction with such body and the recesses 2 they form two laterally spaced but substantially parallel clips of C-shaped as viewed from the side as will be apparent from Figures 1 and 3. The spaced ends of the legs or prongs are cut obliquely as at 4 so that they are given sharp points and so that when pressed together to close the device the opposed ends will meet with an oblique junction line as shown in Figure 2.

A second plate 5 is riveted as at 6 to the centre part of the body portion of the plate 1, such further plate being mounted on its edge so that it extends at right angles from the body portion. This further plate 5 is in this example somewhat of crescent shape and includes a tail portion 7 which extends above and behind the upper one of the recesses 2. The end of the plate 5 remote from the tail 7 preferably includes a forwardly extending shoulder or projection 8 which serves to co-operate with the pliers hereinafter described during the operation of applying the ring to an animal.

The opening between the outer ends of the above mentioned legs 3 of the device may be of the order of ½" and when the device is to be applied to an animal these ends are placed on either side of the gristly part of the snout and are then closed together so that they pierce the snout, both the body part of the device and the projecting legs preferably being bent during this operation so that, as seen in side view, instead of being of the original C-shape they form a ring-like part of circular or elliptical shape as will be apparent for example from Figure 2.

Any suitable form of tool may be used for fitting the above described ring but according to the present invention we also provide a pair of pliers particularly adapted for enabling such rings to be very easily and quickly fitted. These pliers as shown in Figures 3 to 5, include two jaws 9, 10 of unequal length and near the end of the shorter jaw 9 we provide a concaved cavity 11 extending across its face while we provide a similar cavity 12 across the face of the second and longer jaw 10. The said two cavities 11, 12 are in alignment with one another so that when the jaws 9, 10 are closed a cavity of substantially cylindrical shape would be formed, the curvature of the cavities 11, 12 corresponding with the curvature of the top and bottom portions of the C-shaped clip parts of the ring or the like concerned.

As shown in Figures 3 and 4, the longer jaw 10 of the pliers is provided with a slot 13 extending longitudinally therealong and adapted to receive the plate 5 extending from the body of the ring or like device, said jaw being of sufficient length and depth to cover or shield the above-mentioned tail portion 7 of said plate. This slot 13 terminates at a point a short distance away from the root of such jaw so that an abutment 14 is formed for the above-mentioned forwardly extending projection 8 of the plate 5 and the ring is thereby prevented from rotating in one direction in the pliers. Said ring is also prevented from turning in the opposite direction by the end 15 of said plate abutting against the opposite jaw 9 of the pliers, the length of the part of the plate between 8 and 15 and the shape of the jaws of the pliers being such as to provide a positive stop preventing the pliers from being closed beyond a position in which the ends of the prong-like legs 3 of the ring or like device are closed against one another. The position is illustrated by Figure 5 and corresponds to the closed condition of the ring or the like illustrated by Figure 2. The ring or the like is therefore firmly supported in the pliers whilst in its open condition and for the purpose of closing the ring the pliers can be quickly closed without any danger of the ring being crushed or closed beyond a desired extent. Moreover, owing to the co-operation between the ring and the pliers there is no danger of accidentally injuring the animal, for instance, by pressing the plate part 5 of the ring against the snout.

When the above described ring or the like is in its closed condition the point of the tail portion 7 of the plate 5 may extend to a point about ½" from the periphery of the ring-like part of the device for use on the snouts of pigs although it will be appreciated that such part may extend to any desired distance and in cases where there are several points, as may be provided by incorporating several plate parts, such as 5, side by side in the device, these may extend to different distances or be in alignment with one another.

In the case of devices having several plate parts such as 5, the pliers for use therewith would of course be provided with several of the slots 13, or with a suitably wide slot, to accommodate all these plates.

In the modified form of ring shown in Figures 6 and 7 the device includes a body portion comprising a plate 1 having recessed end portions forming four legs 3 precisely as described with reference to the earlier figures. The device also includes a projecting plate 5 which may for instance be riveted to the plate 1 as indicated at 6 and as described with reference to the earlier figures. Such plate 5, however, does not include a tail portion extending behind the body portion, i. e. a part equivalent to the part 7 of the earlier described embodiment, but includes a tail portion 7' which terminates within the limits of the body portion. The projection 5 does not therefore cause any direct pain to the animal when it is moved but it does so indirectly in that the plate 1 tends to twist about one pair of prongs 3, 3 and the other pair tends to swing outwardly so drawing the gristly part of the snout away from the adjacent fleshy or sensitive part. The device shown in Figures 6 and 7 therefore also avoids causing any pain or undue inconvenience to an animal to which it is fitted so long as such animal does not start any rooting or like operations but movements due to any attempt to root immediately cause the animal pain.

The device shown in Figures 6 and 7 may be applied with the tool shown in Figures 2 to 4 and as in the case of the earlier described embodiment no objectionable cruelty is involved in the fitting of the device.

The device shown in Figures 6 and 7 is particularly applicable for use on boars, although it is in many cases quite suitable for use on sows as well.

Whilst we have hereinbefore described some examples of pig-rings or the like and pliers for use in connection with such rings we wish it to be understood that the specific details may be varied without departing from the scope of our invention. Thus, for instance, the above-mentioned tail portion 7 of the part intended to make contact with a sensitive part of the snout may be rounded instead of pointed. Moreover, the ring may be made from any suitable material and of any desired dimensions.

We claim:

1. A pig-ring comprising a body portion, a pair of prongs extending from the upper end of said body portion, a pair of prongs extending from the lower end of said body portion, the prongs in the respective pairs being in vertical alignment with one another and shaped so as to form with said body portion two laterally spaced C-shaped clips adapted to be closed through the snout of an animal, and a plate-like projection extending outwardly in a vertical plane between said clips.

2. A pig-ring comprising a body portion, a pair of prongs extending from the upper end of said body portion, a plate-like projection extending outwardly in a vertical plane between said prongs, and a pair of prongs extending from the lower end of said body portion, said two pairs of prongs being in vertical alignment and shaped so as to form with said body portion two laterally spaced C-shaped clips adapted to be closed through the snout of an animal and said prongs having oblique ends serving to prevent lateral deformation after the prongs in the respective pairs have been closed into engagement with one another.

3. A pig-ring as claimed in claim 1 wherein said body portion and said pairs of prongs are formed from a single plate.

4. A pig-ring comprising a body portion, a projection extending outwardly therefrom in a vertical plane, prongs extending from said body portion on each side of the plane of said projection and adapted to be passed through a relatively insensitive part of the snout of an animal and to be bent into ring formation, and a tail portion extending from said projection extending outwardly from said body portion, said tail portion extending beyond said body portion to an extent adequate for making contact with a sensitive part of the snout of the animal in the event of said ring being forcibly moved after being fitted to the snout of the animal.

5. A pig-ring comprising a body portion of plate-like form, a pair of prongs extending from the upper end of said body portion, said pairs of prongs being in vertical alignment with one another and shaped so as to form two laterally spaced C-shaped clips adapted to be closed through the snout of an animal, and a projection extending outwardly in a vertical plane from said body portion, said projection including a tail portion which extends to a point which will be positioned over a sensitive part of the snout of an animal when such ring is fitted thereby causing the animal pain in the event of movement due to rooting operations.

6. A pig-ring as claimed in claim 5 wherein said outwardly extending projection is of plate-like form.

7. A pig-ring comprising a body portion, a pair of prongs extending from the upper end of said body portion, a pair of prongs extending from the lower end of said body portion, said pairs of prongs being in vertical alignment with one another and shaped so as to form with said body portion two laterally spaced C-shaped clips adapted to be closed into ring-like form through the snout of an animal, and a projection extending outwardly from said body portion in a vertical plane between said clips and adapted to cooperate with the jaws of pliers employed for fitting such ring in such a way as to prevent said pliers from being closed to an extent beyond that necessary for properly applying said ring.

8. A pig-ring comprising a body portion, a pair of prongs extending from the upper end of said body portion, a pair of prongs extending from the lower end of said body portion, said pairs of prongs being in vertical alignment with one another and shaped so as to form with said body portion two laterally spaced C-shaped clips adapted to be closed into ring-like form through the snout of an animal and a projection of plate-like form extending outwardly from said body portion in a vertical plane between said clips, said projection of plate-like form incorporating a shouldered portion adapted to serve as a stop for preventing the pliers employed for fitting the pig-ring from being closed to an extent beyond that necessary for properly applying the ring.

9. A pig-ring comprising a plate-like body portion, a pair of prongs extending from the upper end of said body portion, a pair of prongs extending from the lower end of said body portion, said pairs of prongs being in vertical alignment with one another and shaped so as to form with said body portion two laterally spaced C-shaped clips adapted to be closed into ring-like shape through an insensitive part of the snout of an animal, a plate-like projection extending outwardly from said body portion in a vertical plane between said clips, a tail portion extending from said plate-like projection in a rearward direction so as to terminate over a sensitive part of the snout when the ring is fitted and a shouldered portion on said plate-like projection adapted to serve as an abutment for preventing the pliers employed in fitting the ring from being closed to an extent beyond that necessary for properly applying the ring.

ERNEST CHALMER.
HUBERT TAYLOR.